United States Patent
Bürker et al.

(10) Patent No.: US 7,801,655 B2
(45) Date of Patent: Sep. 21, 2010

(54) SIGNAL PROCESSING SYSTEM WITH RAPID SIGNAL PROCESSING

(75) Inventors: Rainer Bürker, Ravensburg (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 515 days.

(21) Appl. No.: 11/916,580

(22) PCT Filed: Jun. 2, 2006

(86) PCT No.: PCT/EP2006/005257
§ 371 (c)(1),
(2), (4) Date: Dec. 5, 2007

(87) PCT Pub. No.: WO2006/131269
PCT Pub. Date: Dec. 14, 2006

(65) Prior Publication Data
US 2008/0201048 A1    Aug. 21, 2008

(30) Foreign Application Priority Data
Jun. 9, 2005    (DE) ................. 10 2005 026 477

(51) Int. Cl.
*G06F 9/28* (2006.01)
*G05B 7/00* (2006.01)

(52) U.S. Cl. ............... 701/66; 701/51; 701/56; 701/62; 701/91; 477/78

(58) Field of Classification Search .......... 701/66; 477/78
See application file for complete search history.

(56) References Cited

U.S. PATENT DOCUMENTS

| 4,625,841 | A | * | 12/1986 | Klatt ................... 192/3.63 |
| 5,272,939 | A | * | 12/1993 | Markyvech et al. ....... 477/120 |
| 6,122,686 | A | | 9/2000 | Barthel et al. |
| 6,151,538 | A | * | 11/2000 | Bate et al. ............ 701/3 |
| 6,459,977 | B1 | * | 10/2002 | Taffin et al. .......... 701/51 |
| 7,151,990 | B2 | | 12/2006 | Eich et al. |
| 7,286,886 | B2 | * | 10/2007 | Klopfer et al. ......... 700/79 |
| 2002/0019292 | A1 | * | 2/2002 | Popp et al. ........... 477/156 |
| 2003/0014173 | A1 | * | 1/2003 | Loeffler et al. ........ 701/51 |
| 2006/0080019 | A1 | * | 4/2006 | Eich et al. ........... 701/51 |

FOREIGN PATENT DOCUMENTS

DE         32 36 208 A1    4/1984

(Continued)

*Primary Examiner*—Thomas G Black
*Assistant Examiner*—Lin B Olsen
(74) *Attorney, Agent, or Firm*—Davis & Bujold, P.L.L.C.

(57) ABSTRACT

A signal processing system with rapid signal processing, for example for controlling the transmission of a motor vehicle, with an input module that calls for a desired reaction by emitting a request signal, a signal processing module, and a target module that implements the desired reaction, which, to accelerate processing, provides that several steps are carried out in parallel, such that the said signal processing module comprises a check module and a clock module each of which receives the request signal, the signal processing module also comprises an actuator module acting between the input module and the clock module, the clock module is connected to the output of the check module, and the actuator module is connected to the target module for transmitting the output signal of the signal processing module.

8 Claims, 1 Drawing Sheet

FOREIGN PATENT DOCUMENTS

| | | |
|---|---|---|
| DE | 196 53 193 A1 | 7/1998 |
| DE | 199 00 820 A1 | 9/1999 |
| DE | 100 02 519 C1 | 4/2001 |
| DE | 101 57 506 A1 | 9/2002 |
| DE | 102 37 167 A1 | 3/2003 |
| DE | 102 32 165 A1 | 2/2004 |
| DE | 102 40 584 A1 | 3/2004 |
| EP | 0 647 890 A1 | 4/1995 |
| EP | 0 685 664 A2 | 12/1995 |

\* cited by examiner

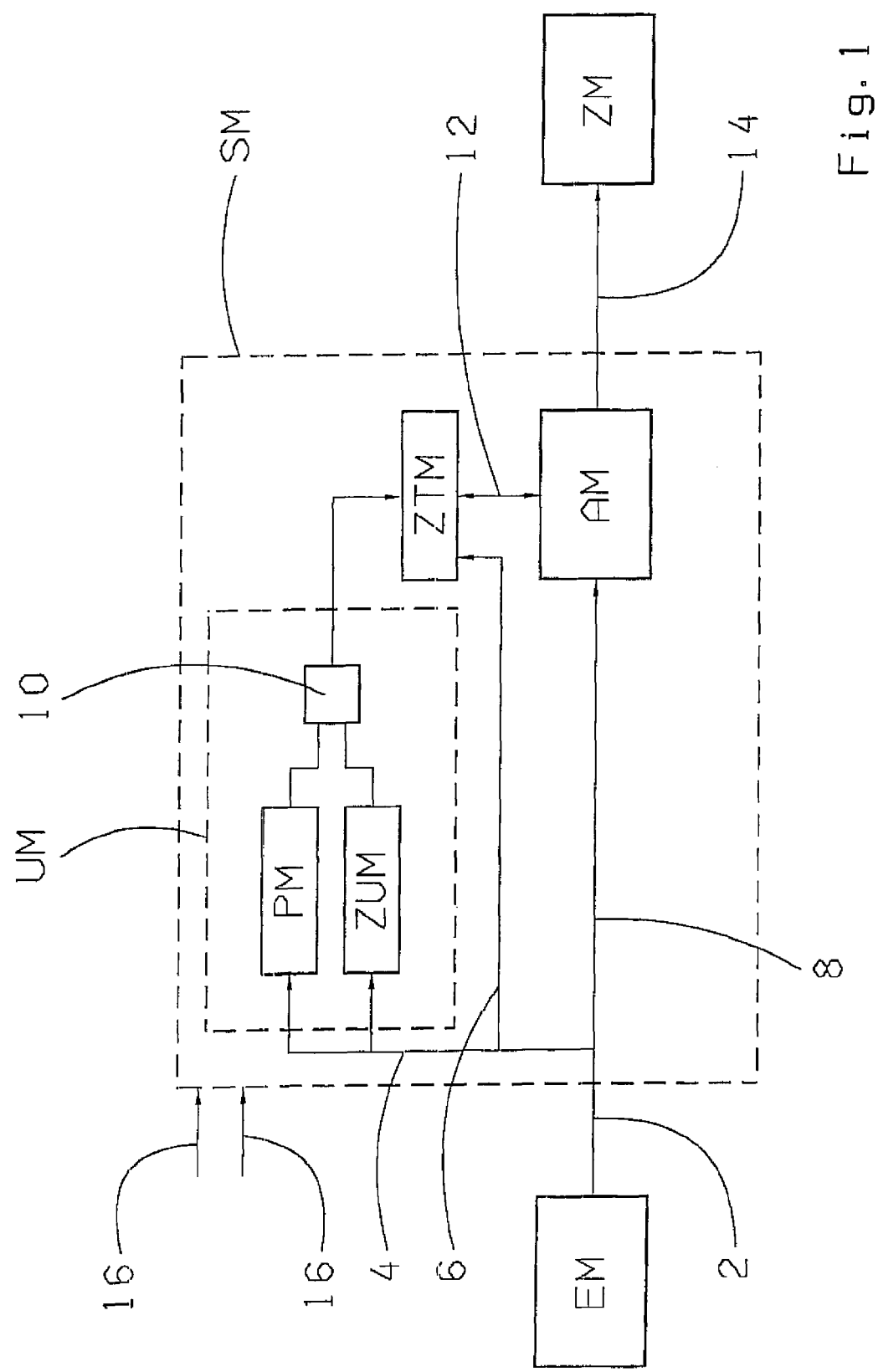

SIGNAL PROCESSING SYSTEM WITH RAPID SIGNAL PROCESSING

This application is a national stage completion of PCT/EP2006/005257 filed Jun. 2, 2006, which claims priority from German Application Serial No. 10 2005 026 477.8 filed Jun. 9, 2005.

FIELD OF THE INVENTION

The invention concerns a signal processing system with rapid signal processing, preferably for a motor vehicle, for example for a motor vehicle transmission control system and a method for carrying out rapid signal processing in a signal processing system.

BACKGROUND OF THE INVENTION

Concerning signal processing systems it is generally known by way of a manually actuated input module a request signal is emitted, which calls for a desired reaction. Such an input module is as a rule connected upstream from a signal processing module whose output signal is passed to a target module, which then implements the required reaction.

Such known signal processing systems are used in motor vehicle transmission control units. These often complex electronicsystems can be roughly divided into the three modules mentioned above, wherein the input module that calls for the desired reaction and emits a corresponding request signal is a manually actuated gear selector level or drive switch. The target module or actuator can either be part of the signal processing module or partially configured outside it.

The signal processing module lying intermediate in the signal flow is a transmission control unit or contains at least parts of one. Here the transmission control unit can be separately developed or can be developed together with an engine control unit together. The target module and/or an actuator module can both be designed as a component of the signal processing module or also partly outside it.

In such known complex systems, before the output signal from the signal processing module is transmitted to the target module, certain processing steps have to be carried out. Thus, inter alia in a check module the plausibility and admissibility of the signal and the desired reactions of the transmission in the instantaneous driving or movement situation of the vehicle is checked. When this check has been completed, the output signal of the check module authorizes the performance of the steps required to produce the desired reaction.

Downstream from the check module can be connected further modules, which on the whole are interdependent and through which either a signal must pass one after another, or which are at least instructed to act by authorization from one or more other modules.

A disadvantage in this is that despite the use of rapid-switching logic components, hydraulic shift elements etc., the behavior of the system as a whole can be subjectively perceived by the operator as sluggish. This can lead to dissatisfaction with or even reluctance to use technical equipment fitted with such signal processing systems and to unpleasant situations, for example if in road traffic a particularly rapid gear change or the particularly rapid engagement of a gear is desirable, but because of the sluggishness of the system this only happens after a time delay that is perceptible by the operator.

Against this background the purpose of the present invention is to provide a signal processing system with more rapid signal processing, which avoids the above-mentioned disadvantages and leads to the more rapid implementation of the desired reaction with equal reliability. In addition it aims to provide a method for carrying out rapid signal processing in a signal processing system, which avoids the disadvantages of the prior art.

SUMMARY OF THE INVENTION

The invention is based on the understanding that certain part-steps of an overall signal processing process can be carried out in parallel, i.e. at the same time, and that some partial steps can take place already in a quasi-preparatory manner before final authorization by another module or another signal.

Accordingly, the starting point for the invention is a signal processing system with rapid signal processing, preferably for a motor vehicle and for a motor vehicle transmission control unit, which comprises an input module that calls for the desired reaction and emits a request signal for it, a signal processing module, and a target module that implements the desired reaction.

To achieve the stated objectives the invention also provides, in relation to the signal processing module, that the signal processing module comprises a check module that receives the request signal in each case and a clock module, the signal processing module also comprises an actuator module acting between the input module and the clock module, the clock module is connected to the output of the check module, and the actuator module is connected to the target module for transmission of the output signal from the signal processing module.

This arrangement makes it possible for a request signal relating to a system reaction to be checked in the check module, while at the same time the request signal is already used to carry out, in parallel with its checking, a computation and/or control activity that prepares for the actuation of the actuator. If the check shows that the request signal is plausible and admissible, the result is that no time has been lost for the checking procedure since the preparatory control activity for producing the system reaction called for has taken place in parallel with it. If the check of the request signal produces a negative outcome, the preparatory computation and/or control activity can be interrupted before any concrete actuation of the actuator.

Thus, according to the invention it is proposed that in relation to the request signal received and as regards their processing sequence, the check module, the clock module and the actuator module are arranged in parallel with one another and are acted upon in parallel by the request signal. This makes it possible to complete certain preparatory steps simultaneously without having to wait first for the reaction of another module.

Accordingly, the clock module initially receives the information that a request signal has been emitted, and waits for the output signal of the check module. Since it is known to the clock module by pre-programming how long the signal path via the actuator module lasts or, however, when the latter sends the clock module an answer-back message notifying it that all the necessary steps have been completed successfully, the clock module can then immediately authorize the implementation of the desired reaction as soon as it receives a positive signal from the check module.

Thus, the check module preferably also comprises a plausibility module in which it is established with reference to further criteria and/or signals whether the request signal received can indeed be, or is, a signal emitted by the input module. It is here particularly preferable to provide an admissibility module arranged in parallel with this, which checks with reference to other criteria and/or signals whether the reaction envisaged by the request signal is indeed admissible at the time, i.e., in the current operating situation of the vehicle.

In a further design feature of the invention it can be provided that within the check module, the outputs of the plausibility module and the admissibility module are passed to a logic switch. This has the advantage that only when both of these modules, in fact, send a positive signal does the check module transmit its positive output signal to the clock module.

In this connection the term "positive" is not necessarily understood to mean a mathematical quantity but, rather, it expresses the notion that when there are "positive signals" the signal processing can be continued so as to produce the system reaction called for.

In accordance with a concrete embodiment of the invention, the input module is in the form of a gear selector switch of a transmission in a motor vehicle, the actuator module includes components of the transmission, in which a gear or driving direction change is carried out in a preparatory way, and the target module is formed as a clutch that implements the desired reaction.

It can also be provided that the gear selector switch is guided within an H-shaped shift gate and the request signal is emitted by moving it into a pre-selector position and/or when the driver engages a new target gear.

The invention also envisages a method for carrying out rapid signal processing by a signal processing system that comprises an input module which calls for the desired reaction and emits a request signal to that effect, a signal processing module and a target module which implements the desired reaction, the method including the following steps:

a) the request signal is sent to the signal processing module;
b) within the signal processing module the request signal is sent, in parallel and respectively, to a check module and a clock module;
c) the request signal is sent, in parallel, to an actuator module that acts between the input module and the clock module, to prepare the steps necessary for the desired reaction to be implemented in the target module;
d) the output signal from the check module is sent to the clock module;
e) the clock module checks whether the output signal from the check module is present, and if the output signal from the check module is positive, authorizes the output signal from the signal processing module for transmission by the actuator module to the target module.

This procedure has the advantage that measures which may take up considerable time to achieve their objective can already be initiated without first having to wait for decisions from other modules. If authorization is then obtained from the other modules, then the preparatory measures will already have resulted in substantial shortening of the overall time required when, finally, the desired reaction is to be implemented. If this desired reaction is rejected because of the decisions in other modules and therefore is not carried out, then the system as a whole remains, at least mechanically, in the condition in which it was before the request signal was emitted.

In this it is preferred that after step c) a plausibility time switch is started in the clock module, and that if the check module (ÜM) signal appears within a specified plausibility interval, i.e. the plausibility check and the admissibility check were both successful, only then is the output signal that authorizes the desired reaction transmitted from the clock module to the actuator module.

Finally, let it be said that the invention described works to give the advantages mentioned, in relation both to the device and to the method concerned, regardless of the manner in which the request signal is produced.

Thus, the request signal can be produced by the driver himself, for example by actuating a gear selector lever, or by virtue of sensor information on the basis of which a fully automatic transmission is controlled in relation to its gear-changing activity.

BRIEF DESCRIPTION OF THE DRAWING

The invention will now be described, by way of example, with reference to the accompanying drawing. It should be mentioned that the invention can be used to good advantage in a number of signal processing systems, preferably in those of passenger cars or commercial vehicles, buses, trains or other special vehicles. Note also that when signal transmission is mentioned in what follows, this can include both electrically and mechanically transmitted signals. Thus the term "signal lines" can also be understood in the sense of signal transmission paths involving mechanical elements.

FIG. 1 shows an input module EM.

DETAILED DESCRIPTION OF THE INVENTION

The drawing shows an input module EM which, when actuated, sends a request signal that calls for a desired reaction, via a signal line 2 of a data bus system, to a signal processing module SM.

Within the signal processing module SM the request signal received is sent, in parallel along corresponding signal paths 4, 6 and 8, to a check module ÜM, a clock module ZTM and an actuator module AM.

The check module ÜM comprises a plausibility module PM and, arranged parallel thereto, an admissibility module ZUM. Their outputs are sent to a logic switch 10 which only emits a positive output signal to the clock module ZTM if the request is both plausible and admissible At the same time as the processes in the check module ÜM, the actuator module AM prepares all the necessary steps and measures that can already be carried out without an answer-back message from the clock module ZTM, but without already actuating the target module that implements the desired reaction.

When authorization is received from the logic switch 10 by the clock module ZTM, then the latter emits a corresponding signal to the actuator module AM via a control line 12.

If the actuator module AM has already carried out the internal completion of all the steps, the output signal from the check module ÜM is immediately switched through, via a signal line 14, to the target module ZM, which then implements the desired reaction.

As a concrete embodiment in an automated transmission for a motor vehicle with redundant signals for the driving direction request of a drive switch or gear selector switch, the input module EM is the drive switch.

For example, the driver of the motor vehicle at rest calls for a change of driving direction. The request signal emitted by the drive switch is sent simultaneously, via signal lines 4, 6 and 8, respectively, to the check module ÜM, the clock module ZTM and the actuator module AM. In this example the actuator module AM stands for all the components of the automatic transmission, including the output clutch, which can carry out preparatory steps without the clutch being engaged so as to implement the desired reaction.

Depending on the signal path, via which an authorization is first notified, to the clock module ZTM, a final authorization for the clutch to engage is given, either after first the actuator module AM and then the check module ÜM have emitted corresponding signals, or after first the check module ÜM and then the actuator module AM have issued those signals.

During the passage of the request signal through the check module ÜM, the signal is switched simultaneously to the plausibility module PM and the admissibility module ZUM. With reference to a series of signals represented symbolically by arrows 16 and sent to the signal processing module SM, it is checked whether the request signal is such a signal at all and whether it is admissible in the movement situation of the vehicle at the time. If the outcome of both checks is positive the logic switch 10 emits an authorization, otherwise the requested reaction is not authorized for the time being and the actuator module AM switches back to the original position of the transmission.

Alternatively, it can also be provided that in the clock module a plausibility time switch is started as soon as the request signal has been received. Only if the check module (ÜM) signal is received within a specified plausibility interval and the plausibility and admissibility checks were therefore successful, is authorization given for the driving direction request called for by the driver.

In another example embodiment of a transmission actuation device with an H-shift for an automated transmission the following advantage is obtained. Usually, for a transmission gear change the selector lever is first moved by the driver to neutral; then it is moved in the pre-selector gate until, finally, the new target gear is engaged. In this, as is known, the selector lever position in Neutral and/or the gate selected is established and recognized as plausible by electronic filtering and/or smoothing of the request signal. Only when this process has been completed is the shift process continued.

Now however, according to the invention, when the Neutral and/or the chosen position of the selector lever is first recognized, the shift sequence is continued directly and immediately by the actuator module AM until the check module ÜM delivers its output signal in the next shifting phase. This can result in considerable shortening of the shifting time. But if the check module ÜM does not authorize the request signal from the selector lever, the for example mechanically already far advanced shift in the transmission is interrupted and the transmission reverts to its original condition.

REFERENCE NUMERALS 2 signal line
4 signal path
6 signal path
8 signal path
10 logic switch
12 control line
14 control line
16 arrow
AM actuator module
EM input module
PM plausibility module
SM signal processing module
ÜM check module
ZM target module
ZTM clock module
ZUM admissibility module

The invention claimed is:

1. A signal processing system with rapid signal processing for controlling a motor vehicle transmission of a motor vehicle, having an input module (EM) which calls for a desired reaction and emits a request signal to that effect, a signal processing module (SM) and a target module (ZM) for implementing the desired reaction, wherein the signal processing module (SM) comprises a check module (ÛM) and a clock module (ZTM) which each receives the request signal, the signal processing module (SM) also includes an actuator module (AM) acting between the input module (EM) and the clock module (ZTM), the output from the check module (ÛM) being sent to the clock module (ZTM), and the actuator module (AM) being connected to the target module (ZM) for transmitting the output signal from the signal processing module (SM), and the check module (ÛM), the clock module (ZTM) and the actuator module (AM) being acted upon in parallel with one another by the request signal, and the request signal being checked in the check module (ÛM) while at the same time certain steps are carried out in a preparatory way in the actuator module by the unchecked request signal.

2. The signal processing system according to claim 1, wherein the authorization of the output signal takes place:
when both the check module (ÛM) and the actuator module (AM) send positive signals to the (ZTM), or
when a positive signal from the check module (ÛM) is received by the clock module (ZTM) within a specified plausibility interval.

3. The signal processing system according to claim 1, wherein the check module (ÛM) comprises a plausibility module (PM) and an admissibility module (ZUM).

4. The signal processing system according to claim 3, wherein the plausibility module (PM) and the admissibility module (ZUM) are arranged in parallel with one another with regard to the signal processing, and outputs from the plausibility module (PM) and the admissibility module (ZUM) are sent to a logic switch (10).

5. The signal processing system according to claim 1, wherein the input module (EM) comprises a gear selector switch of a transmission associated with the motor vehicle, and the actuator module (AM) includes transmission components in which a gear or driving direction change is carried out in a preparatory way, and the target module comprises a clutch for implementing the desired reaction.

6. The signal processing system according to claim 5, wherein the transmission selector switch is formed to be guided in an H-shaped gate, and the request signal is emitted by moving the selector switch to one of a pre-selector position and a new target gear.

7. A method for carrying out rapid signal processing in a signal processing system comprising an input module (EM) which calls for a desired reaction and emits a request signal to that effect, a signal processing module (SM), and a target module (ZM) for implementing the desired reaction, said method comprising the steps of:
a) sending the request signal to the signal processing module (SM);
b) within the signal processing module (SM), sending the request signal in parallel and respectively to a check module (ÛM), to a clock module (ZTM) and to an actuator module (AM) acting between the input module (EM) and the clock module (ZTM);
c) checking the request signal in the check module (ÛM) while, at the same time in the actuator module (AM), carrying out steps required for the implementation of the desired reaction in the target module (ZM) in a preparatory way by virtue of an unchecked request signal;

d) sending the output signal from the check module (ÛM) to the clock module (ZTM);

e) checking in the clock module (ZTM) whether the output signal from the check module is present;

f) if the output signal from the check module (ÛM) is positive and the actuator module (AM) has sent an answer-back message to the clock module (ZTM) that all necessary steps have been completed, the actuator module (AM) authorizing transmission of the output signal from the signal processing module (SM) to the target module (ZM).

8. The method according to claim 7, further comprising the step of when the request signal has been sent in accordance with step b), starting a plausibility time switch in the clock module (ZTM) and, if plausibility has been confirmed and the admissibility check has succeeded within a specified plausibility interval, authorizing in accordance with step f).

* * * * *